(12) United States Patent
Schroder

(10) Patent No.: US 7,494,133 B2
(45) Date of Patent: Feb. 24, 2009

(54) FOUR WHEEL CHASSIS FOR A FLOOR CONVEYOR, A COUNTERWEIGHT STACKER IN PARTICULAR

(75) Inventor: Henrik Schroder, Winsen-Roydorf (DE)

(73) Assignee: Jungheinrich Aktiengesellschaft, Hamburg (DE)

(*) Notice: Subject to any disclaimer, the term of this patent is extended or adjusted under 35 U.S.C. 154(b) by 322 days.

(21) Appl. No.: 11/475,744

(22) Filed: Jun. 27, 2006

(65) Prior Publication Data
US 2007/0029741 A1  Feb. 8, 2007

(30) Foreign Application Priority Data
Jul. 11, 2005 (DE) .................... 10 2005 032 263

(51) Int. Cl.
*B60G 17/00* (2006.01)
*B60G 17/017* (2006.01)
(52) U.S. Cl. ................................ 280/6.159; 280/6.153
(58) Field of Classification Search .......... 280/124.159, 280/6.159, 5.514, 6.16; 254/418, 423
See application file for complete search history.

(56) References Cited

U.S. PATENT DOCUMENTS

| | | | |
|---|---|---|---|
| 3,068,023 A | 12/1962 | Fiala | |
| 4,340,235 A | 7/1982 | Thompson | |
| 4,746,133 A * | 5/1988 | Hanser et al. | 280/6.153 |
| 4,973,080 A * | 11/1990 | Ikemoto et al. | 280/5.501 |
| 5,176,391 A * | 1/1993 | Schneider et al. | 280/6.153 |
| 5,258,913 A * | 11/1993 | Baldauf | 701/37 |
| 5,547,211 A * | 8/1996 | Runkel | 280/6.159 |

FOREIGN PATENT DOCUMENTS

| | | |
|---|---|---|
| DE | 919 517 | 9/1954 |
| DE | 1 051 196 | 8/1959 |
| DE | 1 580 793 | 5/1966 |
| DE | 42 21 943 A1 | 3/1993 |
| DE | 197 53 412 A1 | 6/1999 |
| EP | 0 552 848 A2 | 11/1990 |
| EP | 1 162 092 A2 | 5/2001 |

* cited by examiner

Primary Examiner—John Q. Nguyen
Assistant Examiner—Nicole Verley
(74) Attorney, Agent, or Firm—Vidas, Arrett & Steinkraus, P.A.

(57) ABSTRACT

A four wheel chassis for a floor conveyor, a counterweight stacker in particular, in which the ends of the front and rear axle or the wheels, respectively, are supported with respect to the vehicle frame via double-acting hydraulic cylinders, which on their turn co-operate with hydraulic accumulators and constitute a hydraulic chassis system, wherein first controllable on-off valves separate the hydraulic accumulators from the hydraulic cylinders at option, and wherein a hydraulic lifting equipment for a load supporting means is provided, wherein a hydraulic system for the lifting equipment co-operates with the hydraulic chassis system via a pressure intensifier, and the pressure in the chassis system and with this a compression movement is changed as a function of the taken-up load.

14 Claims, 1 Drawing Sheet

FOUR WHEEL CHASSIS FOR A FLOOR CONVEYOR, A COUNTERWEIGHT STACKER IN PARTICULAR

CROSS-REFERENCE TO RELATED APPLICATIONS

Not applicable.

STATEMENT REGARDING FEDERALLY SPONSORED RESEARCH

Not applicable.

BACKGROUND OF THE INVENTION

Conventionally, four wheel floor conveyors, like counterweight stackers for instance, have two not suspended axles in order to ensure good stability. A suspending effect is mostly achieved only through the tyres, so that the driving smoothness and the driving behaviour are moderate, because the vehicle tends to jump.

From EP 1 162 092 A2, the entire contents of which is hereby incorporated by reference in its entirety, it is known to suspend the rear axle of a counterweight stacker in a suspended manner. From DE 1 580 793, the entire contents of which is hereby incorporated by reference in its entirety, it has become known for off-road vehicles and special vehicles for the transportation of heavy and bulky goods to support the front axle as well as the rear axle of the vehicle or the wheels belonging thereto, respectively, via double acting hydraulic cylinders which on their turn co-operate with hydraulic accumulators. In this context, it has further become known to couple the cylinder chambers of the hydraulic cylinders crosswise and to close the connection to the hydraulic accumulators in a voluntary manner if required. Because of the quickly changing axle loads and the turnover stability which is therefore required, this known arrangement can not be applied just like that to floor conveyors.

From DE 1 051 196 A1, the entire contents of which is hereby incorporated by reference in its entirety, it has become known for floor conveyors to swing the frame around the front axle with the aid of hydraulic cylinders, in order to tilt a lifting scaffold on which a load fork is height-adjustably guided about a predetermined amount in this way.

The present invention is based on the objective to provide a four wheel chassis for a floor conveyor, a counterweight stacker in particular, in which a high suspension smoothness is possible at all the wheels, without that the stability at lifted load is restricted. Furthermore, pitching movements of the vehicle body when taking up and setting down a load are to be avoided in a large extent.

BRIEF SUMMARY OF THE INVENTION

In the chassis according to the invention, the axles or the wheels, respectively, are supported via double-acting hydraulic cylinders, which co-operate with hydraulic accumulators in order to provide suspension smoothness in the driving operation. In the operation, the axle loads of a floor conveyor are subject to large fluctuations, as is natural. When taking up and setting down a load, the suspension movement should be as small as possible, and due to this the hydraulic system for the lifting equipment is coupled with the hydraulic chassis system via a pressure intensifier in the invention, through which the pressure in the chassis system and with this the compression movement of the axles or wheels, respectively, is changed as a function of the taken-up load.

Conventionally, the lifting movements on the lifting scaffold are controlled by a hydraulic lifting equipment. When taking up a load, a significant pressure increase takes naturally place when the load supporting means lifts the load. Through lifting the load, the load at the axle near the load increases at the same time, so that a compression movement is to be expected. In the invention, this phenomenon is compensated, because when a pressure increase in the lifting equipment occurs, this is passed over to the chassis system, so that any compression movement is largely avoided.

By nature, when taking up a load, the axle farther from the load is relieved in a floor conveyor. From there it is advantageous according to one embodiment of the invention when the hydraulic system for the suspension of the axle near the load is connected with the rod-end chambers of the hydraulic cylinders for the axle farther from the load. In order to avoid compression movements of the axle farther from the load which are caused by load changes, it is further advantageous when the mechanical parameters and geometric conditions of the axle near the load and of that farther from the load are coordinated such that the pressure increase caused by taking up the load compensates the relief of the axle farther to the load.

According to one embodiment of the invention, the pressure intensifier is connected with the cylinder chambers of the hydraulic cylinders of at least one axle, the axle near the load preferably, via an on-off valve, and the hydraulic accumulator belonging to it is connected to the connection between the on-off valve and the pressure intensifier. When taking up a load, the on-off valve can be closed, so that compression movements are blocked. When taking up a load, the pressure in the hydraulic accumulator is increased through the pressure intensifier, so that pressure surges caused by opening the on-off valve are minimized when the compression movement is enabled later.

According to a further embodiment of the invention, a throttle is arranged between the pressure intensifier and the on-off valve. The latter damps a vibration between the chassis loop and the loop of the lifting equipment when the floor conveyor rides over bumpinesses in the ground. Damping may take place by mechanical friction, too. Finally, it is also conceivable to dispose a throttle in the branch of the pressure intensifier at the lifting scaffold side.

Advantageously, the pressure intensifier is connected with two parallel branches of the hydraulic chassis system via two branches, and the branches of the pressure intensifier have a compulsory coupling such that a pressure compensation via the hydraulic accumulator or the hydraulic accumulators is avoided. When the two branches of the pressure intensifier have pistons, for instance, these may be mechanically connected with each other. Thus, a rolling movement of the floor conveyor is efficiently avoided, because pressure compensation between the hydraulic branches does not take place. Other constructions of a pressure intensifier are also conceivable, a pressure fluid chamber at the lifting scaffold side for instance, which acts upon two pressure fluid chambers at the chassis side which are separated from each other.

According to a further embodiment of the invention, the hydraulic accumulators are connected with the hydraulic chassis system via a parallel circuit of a check valve and a controllable throttle. Through this, fast compression of the corresponding axles is made possible, whereas an energy loss is caused by the throttle at rebounding, so that vibrations are damped. The throttles are adjustable, so that the damping can be matched to the requirements of the vehicle. According to a further embodiment of the invention, readjustment of the throttle as a function of operating—or driving parameters may take place, as a function of the road speed, the road condition, the load which is taken up, for instance. Through this, the damping properties of the suspension system can be adapted to the conditions of the surroundings.

According to one embodiment of the invention, the hydraulic chassis system is realised in a manner such that the cylinder chambers of the hydraulic cylinders of the axle near the load are crosswise connected with each other and the delivery chambers of the hydraulic cylinders of the axle near the load are connected with the rod-end chambers of the hydraulic cylinders of the axle farther from the load. Through this arrangement, pitching vibrations of the vehicle are decreased, because the pressure in the rod-end chambers of the hydraulic cylinders of the axle near the load increases upon compression of the axle near the load and thus a compression of the axle farther from the load is counteracted. Additionally, the stabilisation against rolling of the axle near the load is enhanced, because the pressure in the rod-end chamber of the opposing hydraulic cylinder of the axle farther from the load is increased upon one-sided compression of the axle near the load, and thus the compression of the diagonally opposing wheel is counteracted. According to one embodiment of the invention, the delivery chambers of the hydraulic cylinders of the axle farther from the load are permanently connected with each other, in order to enable oscillating movements of the axle farther from the load for compensating road unevennesses.

According to a further embodiment of the invention, a pressure measuring equipment can be provided, which measures the pressure on at least one position of the hydraulic chassis system, in order to determine the wheel—or axle load at one or both axles. Based on this measurement, the driver can be warned at the danger of tilting of the vehicle or automatic measures against overturn of the floor conveyor can be taken.

According to a further embodiment of the invention, a sensory analysis system can be assigned to the axles or the wheels, respectively, which determines the height of the frame of the vehicle with respect to the ground and which is connected with a control device which triggers a drive for a fluid power pump and a valve arrangement belonging to it, until the desired height is reached at one or both axles. Through this, with the aid of a pump, the body assembly or the frame, respectively, of the vehicle can be lifted up to a certain level with the aid of the hydraulic cylinders, at which compression of the suspension is possible. A flow divider valve may ensure that uniform feed of the fluid power medium to the hydraulic cylinders takes place. With aid of the described arrangement, it is also possible to incline the vehicle around a transverse axis by separate feed of fluid power medium to the hydraulic cylinders of the axle farther from the load, for instance. By doing so, an inclination of the lifting scaffold takes place, too. Therefore, the lifting scaffold can be fixedly connected with the vehicle, and a separate inclining equipment for the lifting scaffold can be omitted.

As has been already mentioned, any jounce has to be avoided as much as possible during taking up or setting down a load. Therefore, one embodiment of the invention provides that on-off valves, through which the hydraulic accumulators are connected with the hydraulic cylinders, are triggered automatically as a function of operation parameters of the floor conveyor, such as road speed, lifting height of the load supporting means and so forth. For instance, when a load is transported in a relatively large height, it is advisable to close the on-off valves in the case that the reduced jouncing effect due to the connection with the lifting system is not sufficient to ensure satisfactory stability.

The invention is hereinafter explained in more detail by means of an example of its realisation.

DETAILED DESCRIPTION OF THE INVENTION

Figure 1:
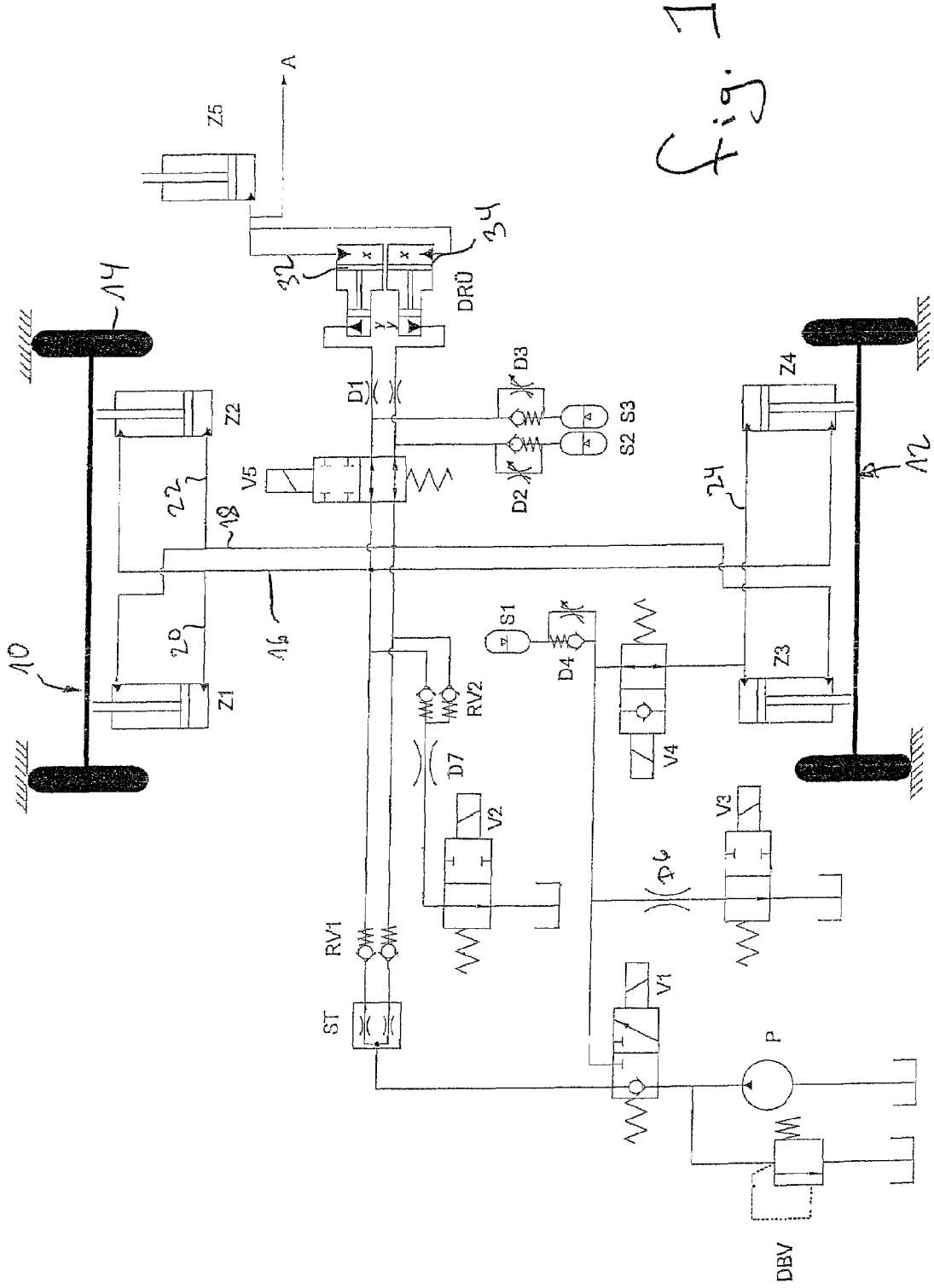
FIG. 1 shows a hydraulic circuit diagram for a four wheel chassis according to the invention.

While this invention may be embodied in many different forms, there are described in detail herein a specific preferred embodiment of the invention. This description is an exemplification of the principles of the invention and is not intended to limit the invention to the particular embodiment illustrated.

In FIG. 1, two axles 10, 12 can be recognised, which bear one wheel 14 on each of their ends. In the example, 10 is the front axle of a counterweight stacker and corresponding to this, 12 is the rear axle. In this case, the front wheels 14 are usually driven and the rear axle is oscillatingly suspended. The front axle 10 is supported on the not shown frame of the floor conveyor with the aid of two double-acting hydraulic cylinders Z1 and Z2. The rear axle 12 is supported on the frame with the aid of the double-acting hydraulic cylinders Z3 and Z4. The rod-end chambers of the hydraulic cylinders Z1 and Z2 are crosswise connected with the rod-end chambers of the hydraulic cylinders Z3 and Z4, namely via lines 16 and 18, respectively. The delivery chambers of the hydraulic cylinders Z1, Z2 are connected via lines 20 and 22, respectively, with the lines 16 and 18, respectively. The delivery chambers of the hydraulic cylinders Z3 and Z4 are connected with each other via a line 24.

A fluid power pump P is connected with a flow divider ST via an on-off valve V1, which has a check valve in one path. The flow divider is connected with the lines 16, 18 via a check valve arrangement RV1. A relief valve DBV, which is connected with the tank of the hydraulic system, is connected to the line between pump P and valve RV1.

At Z5, a lifting cylinder of a not more represented lifting scaffold for the counterweight stacker is indicated. The lifting cylinder Z5 is connected with a controlled pressure fluid source (not shown) for the pressure cylinder Z5 via a connection A. The delivery chamber of the lifting cylinder Z5 is further connected with two inlets of a hydraulic pressure intensifier DRÜ, which has two parallel arranged double pistons 32, 34. The outlets of the pressure intensifier DRÜ are connected via throttles D1 with an on-off valve V5, which connects the outlets of the pressure intensifier DRÜ with lines 16, 18 in its passing condition.

Hydraulic accumulators S2, S3 are connected to the lines between the pressure intensifier DRÜ and the valve V5 at a time, namely via a parallel circuit of an adjustable throttle D2, D3 and a check valve.

Via a controllable on-off valve V4, in the one path of which a check valve is arranged, the line 24 is connected with a further hydraulic accumulator S1 via a parallel circuit of a controllable throttle D4 and a check valve. One outlet of the on-off valve V1 is connected with the connection between the on-off valve V4 and the hydraulic accumulator S1. Further, an on-off valve V3 is connected to this line via a throttle D6, which connects with the tank of the hydraulic system when the passing condition is set. A further valve V2 is connected with the connection lines between the flow divider ST and the valve V5 via lines including a throttle D7 and a check valve RV2. When the passing condition is set, the valve V2 connects with the tank of the hydraulic system.

In the following, the function of the hydraulic system according to the figure will be explained in more detail.

In the pressureless state of the hydraulic cylinders Z1 to Z4, the piston rods are completely retracted, due to the tare weight of the vehicle. In order to enable suspension movement, hydraulic fluid is fed with the aid of the pump P, until the cylinders Z1 to Z4 have reached a medium position. Lifting of the front axle 10 and the rear axle 12 takes place separately. At first, the rear axle is lifted about a certain amount by feeding hydraulic fluid into the delivery chambers of the cylinders Z3 and Z4 via the on-off valve V1 and the on-off valve V4, the on-off valve V3 being closed in this. Thereafter, hydraulic fluid is fed into the cylinders Z1 and Z2 of the front axle 10 via on-off valve V1 and flow divider ST via lines 16, 18. The volume of the cylinders Z1, Z2, displaced in the rod-end chambers, flows into the delivery chamber of the respective opposing cylinders Z2 and Z1, respectively, and also in the rod-end chambers of the cylinders Z3 and Z4, through which the piston rods are retracted again, while the hydraulic fluid escapes from the delivery chambers via valve V3. Then, renewed feed of hydraulic fluid into the delivery chambers of cylinders Z3 and Z4 takes place thereafter, until the frame of the floor conveyor is at the desired level. For this purpose, a sensory analysis system may be provided, which is connected with a not shown electric control device, which triggers the pump P and also the valve V1 and V2 and the valves V3 and V4 in a corresponding manner. The flow divider valve ST ensures that the cylinders Z1, Z2 of the front axle 10 extend uniformly, so that the vehicle frame is parallel aligned to the front axle 10. When the vehicle is not used, the system is made pressureless by the valves V2 and V3. They enable the flow-out of the hydraulic fluid to the tank. Protection against excess pressure when filling the system takes place with the aid of the relief valve DBV.

Through the crosswise circuitry of the double-acting cylinders Z1 and Z2 and that of the cylinder chambers of the cylinders Z1, Z2 with the rod-end chambers of the rear cylinders Z3, Z4, a pitching vibration of the vehicle is reduced, because when the front axle 10 is compressed, the pressure in the rod-end chambers of the rear cylinders Z3 and Z4 increases, and thus it counteracts the rebounding of the rear axle 12. The already present rolling stabilisation of the front axle 10 is enhanced in that upon one-sided compression of the front axle 10, the pressure in the rod-end chamber of the opposing rear axle cylinder Z3 and Z4, respectively, is increased, and thus it counteracts rebounding of the diagonally opposing rear wheel.

The delivery chambers of the rear axle cylinders Z3 and Z4 are permanently connected with each other, in order to enable swinging movement of the rear axle 12 for the compensation of road unevennesses.

Suspension movements of the described hydraulic system are made possible by the gas fillings of the hydraulic accumulators S1 to S3. In order to achieve damping of the suspension movements, the throttle/check valve combination D1 to D4 is assigned to each hydraulic accumulator S1 to S3, which enables fast compression of the respective axle, but causes an energy loss through the throttle upon rebounding, so that vibrations are damped. The cross section of the throttle can be adapted to the requirements of the vehicle. An automatic dependence of operation parameters can also be provided, such as road speed, road conditions, the load that is taken up, and so forth.

For instance, in order to increase the stability of the stacker when stacking in a load in a big height, the chassis is changed over to a very high suspension rigidity. For this purpose, the valves V4 and V5 are triggered by the not shown electronics. Suspension movements which could lead to overturn of the vehicle are blocked through this. It is advantageous when the valves V4 and V5 are triggered automatically by the control electronics as a function of the operation condition of the floor conveyor, for which purpose the signals of sensors for measuring the road speed, lifting height and the like can be used.

As is natural, the axle loads of a floor conveyor are subject to a great extent of variation in its operation. Therefore, the connection of the hydraulic chassis system with the lifting cylinder Z5 is provided. The lifting movements of the lifting scaffold are usually controlled by a hydraulic circuit, which is not shown here. The hydraulic junction is designated with A.

When a load is taken up, hydraulic fluid is fed from A into the lifting cylinder Z5 and a significant pressure increase takes place in the moment in which the load supporting means lifts the load. Through this, the load on the front axle 10 is increased at the same time, so that compression movement is to be expected. This effect is alleviated or compensated in that a pressure increase in the lifting cylinder Z5 leads to a pressure increase in the chassis system via the pressure intensifier DRÜ, so that the compression movement is avoided to a great extent. When the valves V4 and V5 are completely closed when taking up a load, the pressure in the hydraulic accumulators is increased via the pressure intensifier DRÜ such that upon later permission of the suspension movements, the pressure surges are minimized through switching the valve 5.

As is natural, when a load is taken up, the rear axle 12 is relieved. Through the described connection with the rod-end chambers of the rear axle cylinders Z3 and Z4 and the cylinder chambers of the front axle cylinders Z1, Z2, a suspension movement of the rear axle 12 caused by load change is also avoided. However, it is advantageous when the mechanical parameters and geometric conditions of front-and rear axle are coordinated such that the pressure increase in the suspension system caused by taking up the load compensates the relief of the rear axle 12.

Rolling movements of the floor conveyor are avoided in that no hydraulic connection exists between the hydraulic accumulators S2 and S3 in the operation. For this purpose, the pistons 32, 34 of the pressure intensifier DRÜ are mechanically connected with each other in a not shown manner, so that both pistons 32, 34 must pass equal path lengths. Thus, the function of stabilising the rolling movement is retained, despite the fact that a compensation of the axle load change takes place through the retraction of the lifting cylinder Z5.

The throttles D1 damp vibrations caused on the lifting cylinder when the floor conveyor rides over ground unevennesses.

By appropriate balancing of the mechanical parameters of the axle suspensions as well as of the dimensions of the hydraulic components, readjusting operations through the pump P and the valves V1 to V3 during the usual operation of the floor conveyor can be completely avoided. Therefore, the pump P can be omitted when another pump existing in the floor conveyor is used for the readjusting operation. Through this, the construction requirements for the chassis system are reduced.

By measuring the hydraulic pressure at different sites in the represented hydraulic suspension system, it is possible to determine the actual axle or wheel loads. With the aid of these measurements, the driver can be warned when the vehicle is in danger of turnover, or measures against turnover of the floor conveyor can be taken automatically.

With the shown chassis system, it is also possible to induce an inclination of the frame by deliberately taking out hydraulic fluid or feeding hydraulic fluid to the cylinders Z1 and Z2 or Z3 and Z4, respectively. In this case, the lifting scaffold can be fixedly connected with the vehicle frame and it can be inclined in a desired manner in spite of this.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A four wheel chassis for a floor conveyor, in which the ends of the front and rear axle or the wheels, respectively, are supported with respect to the vehicle frame via double-acting hydraulic cylinders, which on their turn co-operate with hydraulic accumulators and constitute a hydraulic chassis system, wherein first controllable on-off valves separate the hydraulic accumulators from the hydraulic cylinders at option, and wherein a hydraulic lifting equipment for a load supporting means is provided, characterised in that a hydraulic system for the lifting equipment (Z5) co-operates with the hydraulic chassis system via a pressure intensifier (DRÜ), and the pressure in the chassis system and with this a compression movement is changed as a function of the taken-up load.

2. A four wheel chassis according to claim 1, characterised in that the pressure intensifier (DRÜ) is connected with the cylinder chambers of the hydraulic cylinders (Z1 to Z5) of at least one axle (10, 12), the axle near the load (10), via a second on-off vale (V5), and the hydraulic accumulator (S2, S3) belonging to it is connected to the connection between the second on-off valve (V5) and the pressure intensifier (DRÜ).

3. A four wheel chassis according to claim 2, characterised in that a throttle (D1) is arranged between the pressure intensifier (DRÜ) and the second on-off valve (V5).

4. A four wheel chassis according to claim 2, characterised in that a hydraulic accumulator (S1) for the axle farther from the load is also connected with the hydraulic cylinders (Z3, Z4) of this axle (12) via a first on-off valve (V4).

5. A four wheel chassis according to claim 2, characterised in that the pressure intensifier (DRÜ) is connected with the two parallel branches (16, 18) of the hydraulic chassis system via two branches, and the branches of the pressure intensifier (DRÜ) have a compulsory coupling such that a pressure compensation between the hydraulic accumulators (S2, S3) via the lifting cylinder (Z5) is avoided.

6. A four wheel chassis according to claim 2, characterised in that the on-off valves (V4, V5) for the hydraulic accumulator (S1 to S3) are triggered for purposes to turn off as a function of operation parameters of the floor conveyor, such as road speed, lifting height of the load supporting means and so forth.

7. A four wheel chassis according to claim 1, characterised in that the pressure intensifier (DRÜ) is connected with parallel branches of the hydraulic chassis system via two branches, and each one hydraulic accumulator (S2, S3) is assigned to each one of these branches.

8. A four wheel chassis according to claim 1, characterised in that the hydraulic accumulators (S1 to S3) are connected with the hydraulic chassis system via a parallel circuit of a check valve and a controllable throttle (D2 to D4).

9. A four wheel chassis according to claim 8, characterised in that the throttles (D2 to D4) are changeable as a function of the road speed and/or the road condition and/or the load which is taken up.

10. A four wheel chassis according to claim 1, characterised in that the mechanical parameters and geometric conditions of the axle near the load and of that farther from the load (10, 12) are coordinated such that the pressure increase caused by taking up the load compensates the relief of the axle (12) farther to the load.

11. A four wheel chassis according to claim 1, characterised in that the cylinder chambers of the hydraulic cylinders (Z1, Z2) of the axle (10) near the load are crosswise connected with each other and the delivery chambers of the hydraulic cylinders (Z1, Z2) of the axle (10) near the load are connected with the rod-end chambers of the hydraulic cylinders (Z3, Z4) of the axle (12) farther from the load.

12. A four wheel chassis according to claim 11, characterised in that a fluid power pump (P) is connected with the crossing branches (16, 18) of the hydraulic chassis system via a flow divider (ST).

13. A four wheel chassis according to claim 11, characterised in that the pump (P) is optionally connected with the delivery chambers of the hydraulic cylinders of one axis (10, 12) at a time via a third on-off valve (V1).

14. A four wheel chassis according to claim 11, characterised in that a fourth on-off valve (V4) is arranged between the third on-off valve (V1) and the delivery chambers of the hydraulic cylinders of the axle (12) farther from the load, which is simultaneously arranged in the line of a hydraulic accumulator (S1) for the hydraulic cylinders (Z3, Z4) farther from the load.

* * * * *